(12) United States Patent
Deachin et al.

(10) Patent No.: US 11,654,976 B2
(45) Date of Patent: May 23, 2023

(54) ANTI-FLUTTER BAFFLE

(71) Applicant: Zephyros, Inc., Romeo, MI (US)

(72) Inventors: Kyle Deachin, Romeo, MI (US);
Nicholas Agostini, Romeo, MI (US);
Eric White, Romeo, MI (US); Dennis Skonieczny, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 517 days.

(21) Appl. No.: 16/617,320

(22) PCT Filed: Jun. 4, 2018

(86) PCT No.: PCT/US2018/035893
§ 371 (c)(1),
(2) Date: Nov. 26, 2019

(87) PCT Pub. No.: WO2018/223139
PCT Pub. Date: Dec. 6, 2018

(65) Prior Publication Data
US 2020/0164927 A1    May 28, 2020

Related U.S. Application Data

(60) Provisional application No. 62/514,358, filed on Jun. 2, 2017.

(51) Int. Cl.
*B62D 29/00* (2006.01)
*B29C 45/14* (2006.01)
(Continued)

(52) U.S. Cl.
CPC ...... *B62D 29/002* (2013.01); *B29C 45/14336* (2013.01); *B60R 13/08* (2013.01);
(Continued)

(58) Field of Classification Search
CPC ...... B29C 45/14336; B29K 2105/0002; B29L 2031/30; G10K 11/162; B60R 13/08; B62D 29/002
(Continued)

(56) References Cited

U.S. PATENT DOCUMENTS 5,506,025 A * 4/1996 Otto ...................... B62D 29/002
428/476.3
6,988,585 B2 * 1/2006 Mourieras ............ B62D 29/002
296/187.02
(Continued)

FOREIGN PATENT DOCUMENTS

DE 102006014963 A1 * 10/2007 ............. B60R 13/06
EP 1398250 A2 3/2004
(Continued)

OTHER PUBLICATIONS

PCT Search Report dated Sep. 26, 2018, Application No. PCT/US2018/035893.
(Continued)

*Primary Examiner* — Forrest M Phillips
(74) *Attorney, Agent, or Firm* — The Dobrusin Law Firm, PC

(57) ABSTRACT

A baffle assembly for use in a transportation vehicle, comprising a carrier including an interior portion that includes a plurality of walls extending upward, a rim portion that extends to substantially surround the interior portion and a fastener that extends upward from the rim portion in the same direction as the plurality of walls. The baffle also includes a resinous sealant that includes a polymer that is adapted for thermal expansion upon activation by heat that is located on at least a portion of the interior portion wherein the rim portion is substantially free of any sealant.

20 Claims, 2 Drawing Sheets

(51) Int. Cl.
  *B60R 13/08* (2006.01)
  *G10K 11/162* (2006.01)
  *B29K 105/04* (2006.01)
  *B29L 31/30* (2006.01)

(52) U.S. Cl.
  CPC ........ *G10K 11/162* (2013.01); *B29K 2105/04* (2013.01); *B29K 2995/0002* (2013.01); *B29L 2031/30* (2013.01)

(58) Field of Classification Search
  USPC .......................................................... 181/294
  See application file for complete search history.

(56) References Cited

U.S. PATENT DOCUMENTS

| | | | |
|---|---|---|---|
| 7,726,442 B2 * | 6/2010 | Belpaire | ................ B60R 13/07 296/193.06 |
| 8,028,799 B2 | 10/2011 | Hasler | |
| 8,079,442 B2 | 12/2011 | Wojtowicki | |
| 8,087,916 B2 | 1/2012 | Kanie et al. | |
| 8,293,360 B2 | 10/2012 | Cousin et al. | |
| 8,388,037 B2 | 3/2013 | LaNore et al. | |
| 8,444,214 B2 | 5/2013 | Helferty | |
| 8,469,143 B2 | 6/2013 | Prunarety et al. | |
| 8,573,355 B2 * | 11/2013 | Franey | ................ B62D 29/002 181/264 |
| 8,597,763 B2 * | 12/2013 | Lehmann | ............ B62D 29/002 277/606 |
| 8,967,327 B2 * | 3/2015 | Synnestvedt | ........ B62D 29/002 220/563 |
| 2004/0011282 A1 | 1/2004 | Myers et al. | |
| 2005/0053761 A1 * | 3/2005 | Murase | ................... B60J 10/74 428/122 |
| 2005/0268454 A1 * | 12/2005 | White | ................. B62D 29/002 29/592 |
| 2005/0279567 A1 | 12/2005 | Ito | |
| 2006/0073266 A1 | 4/2006 | Myers et al. | |
| 2009/0001758 A1 | 1/2009 | Hanley, IV et al. | |
| 2009/0111371 A1 | 4/2009 | Niezur et al. | |
| 2010/0253004 A1 | 10/2010 | Lehmann et al. | |
| 2010/0320028 A1 | 12/2010 | Wojtowicki | |
| 2011/0057392 A1 | 3/2011 | Monnet et al. | |
| 2011/0109003 A1 | 5/2011 | LaNore et al. | |
| 2011/0189428 A1 | 8/2011 | Belpaire et al. | |
| 2011/0192675 A1 | 8/2011 | Lecroart et al. | |
| 2012/0207986 A1 | 8/2012 | Belpaire et al. | |
| 2012/0295093 A1 | 11/2012 | Belpaire et al. | |
| 2013/0087406 A1 | 4/2013 | Franey | |
| 2013/0140731 A1 | 6/2013 | Belpaire | |
| 2013/0181470 A1 | 7/2013 | LaNore et al. | |

FOREIGN PATENT DOCUMENTS

| | | | |
|---|---|---|---|
| EP | 1935955 A1 | 6/2008 | |
| EP | 2242634 A1 | 10/2010 | |
| EP | 2176113 B1 | 4/2011 | |
| EP | 2330019 A1 | 6/2011 | |
| EP | 2097308 B1 | 7/2011 | |
| EP | 2236358 B1 | 8/2011 | |
| EP | 2360002 A1 | 8/2011 | |
| EP | 2390077 A1 | 11/2011 | |
| EP | 2507116 A1 | 10/2012 | |
| EP | 2533961 A1 | 12/2012 | |
| EP | 2576176 A1 | 4/2013 | |
| EP | 1534561 B1 | 8/2013 | |
| EP | 2262633 B1 | 9/2013 | |
| WO | 2011/134943 A1 | 11/2011 | |
| WO | 2011/147872 A1 | 12/2011 | |
| WO | WO-2011150142 A2 * | 12/2011 | ............ B60R 13/08 |
| WO | 2013/142145 A1 | 9/2013 | |

OTHER PUBLICATIONS

India First Examination Report dated Mar. 25, 2022, Application No. 201937049298.

* cited by examiner

ANTI-FLUTTER BAFFLE

TECHNICAL FIELD

The present teachings relate generally to a baffling and sealing member for reducing panel vibration and minimizing read-through.

BACKGROUND

The transportation industry continues to require methods of baffling, reinforcement and sealing that provide improved functionality while simultaneously providing reduced weight and cost. As a result of such light-weighting efforts, the use of thinner materials combined with the need to adequately connect dissimilar materials may result in undesirable vibration and read-through issues.

It would therefore be desirable to provide structures for improving attachment between an exterior vehicle panel and internal vehicle components that minimizes vibration (e.g., flutter) while also minimizing the tendency for read-through on exterior panels having a relatively thin cross-section. There is thus a need for improved means of securing internal and external materials to one another, in an effort to mitigate some of the negative side effects brought about by light-weighting.

SUMMARY OF THE INVENTION

In a first aspect the present teachings contemplate a baffle assembly for use in a transportation vehicle, comprising a carrier including an interior portion that includes a plurality of walls extending upward, rim portion that extends to substantially surround the interior portion, and a fastener that extends upward from the rim portion in the same direction as the plurality of walls. The baffle may further include a resinous sealant that includes a polymer that is adapted for thermal expansion upon activation by heat that is located on at least a portion of the interior portion, wherein the rim portion is substantially free of any sealant.

The plurality of walls may extend upward to meet a top surface of the interior portion, wherein the top surface is substantially parallel to the rim portion. The rim portion may completely circumscribes the interior portion. The sealant may extend along a portion one or more of the plurality of walls. The sealant may extend over a portion of the top surface of the interior portion. The interior portion may include a top surface that is located at least about 1 mm, at least about 3 mm or even at least about 5 mm above the rim portion. The resinous material may be such that it can be melted for injection molding at a first temperature, and thereafter be activated by heating at an activation temperature above the first temperature for causing it to expand. The fastener may extend substantially perpendicular to the rim portion.

The fastener may be adapted to extend into an opening located on a transportation vehicle member. One or more of the plurality of walls may be arranged at an angle that is substantially perpendicular to the rim portion. The top surface of the interior portion may be a continuous surface that is substantially free of any openings. One or more of the plurality of side walls may include one or more openings. The baffle may include at least four sidewalls. The resinous sealant may extend as a single continuous piece over the interior portion. At least a portion of the interior portion may remain free of any resinous sealant material prior to activation of the resinous sealant material. The baffle may be adapted to extend into a vehicle cavity. The baffle may include at least two fasteners. The resinous sealant may circumscribe the interior portion.

The teachings herein further provide for a method for forming the baffle described herein comprising injecting a polymeric carrier material into a first cavity of a mold to form the carrier, and injecting the resinous sealant material into a second cavity of the mold so that the sealant is located onto the interior portion of the baffle but not onto the rim portion of the baffle.

The teachings herein are also directed to use of the baffle described herein for preventing flutter and/or read-through in a transportation vehicle.

The teachings herein contemplates a device and method for the sealing of cavities with a combination comprising a carrier and a resinous material, the carrier material having a raised interior portion, a rim portion and a fastener.

DETAILED DESCRIPTION

Figure 1:
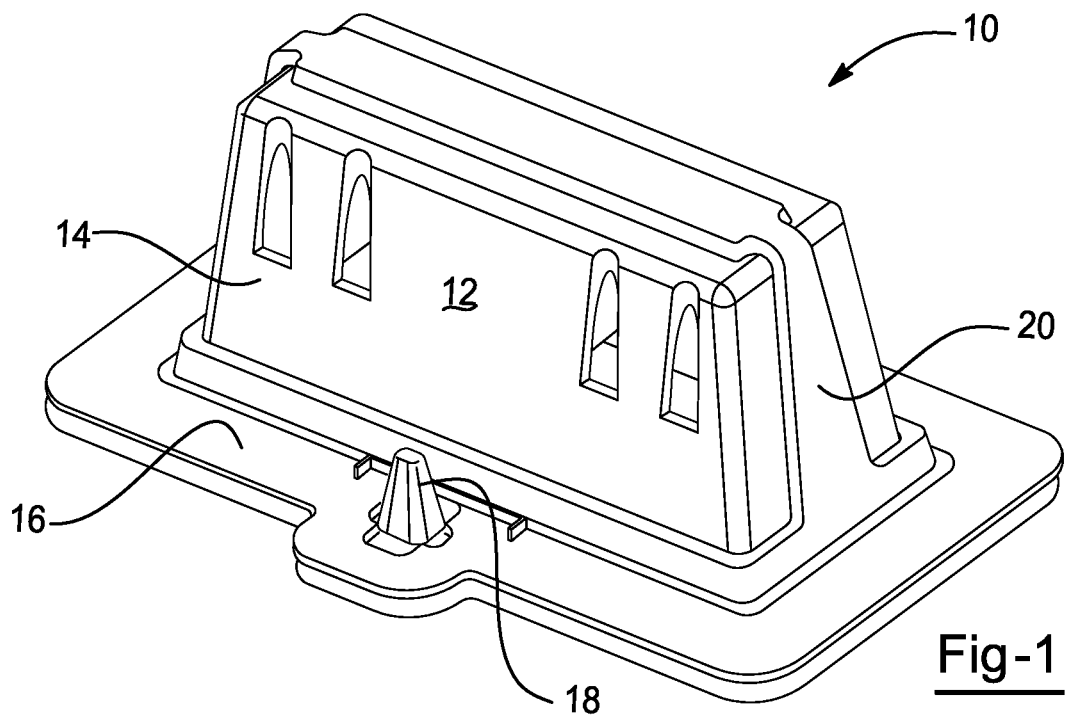
FIG. 1 shows a perspective view of an illustrative example of the baffle assembly of the present teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the filing date of U.S. Provisional Application Ser. No. 62/514,358, filed Jun. 2, 2017, the contents of that application being hereby incorporated by reference herein for all purposes.

The baffle assembly includes a carrier, which may have a variable and non-planar surface topography. The carrier may be formed of a first material and is generally contacted with a second material that may be dissimilar from the first material that forms the carrier. The carrier may have an interior portion which may have a first outwardly facing surface and a second outwardly facing surface that generally opposes the first outwardly facing surface. The interior portion may be at least partially surrounded by a rim portion. The second material (e.g., the sealant material) may be located onto the carrier such that it contacts at least a portion of the inner surface. The rim portion may be free of any sealant material.

The carrier may include a rim portion that surrounds the interior portion of the carrier. More specifically, the rim portion may include an outwardly projecting ledge. The rim portion may be connected to the inner portion along a barrier wall which may extend substantially around the inner portion or may extend only partially around the inner portion. One or more of the rim portion, the outwardly projecting ledge and the barrier wall may be free of any additional extensions.

A fastener may be included that is integrally formed with the carrier or separately formed from the carrier. The fastening means may extend from the rim portion. The fastening means may be located in a different plane than the interior portion of the carrier or may be located in the same plane as the interior portion of the carrier. The fastening means may extend substantially parallel to the interior portion of the carrier or may extend substantially perpendicular to the interior portion of the carrier. The fastening means may extend at a skew angle relative to the interior portion of the carrier. The fastening means may include an arrowhead fastener, a tree-fastener, a clip, a hook or the like. The fastening means may include an opening for receiving an extension from within a cavity into which the baffle assembly is located. The fastening means may be provided as a magnetic material or an adhesive material that can attach (e.g., adhere or magnetically secure) the baffle assembly to a cavity. In such an embodiment, the magnetic material or the adhesive material may be interspersed within the carrier or the second material. Alternatively, the magnetic material or the adhesive material may be disposed upon the carrier and/or the second material or may be otherwise connected to the carrier and/or the second material.

The baffle assembly may be substantially free of any structure on the carrier for preventing flow of the second material onto the rim portion of the carrier. Certain portions of the carrier may be substantially free of any structure for securing the second material to the carrier. As an example, the interior portion may be substantially free of any structural members for securing the second material to the carrier. The barrier wall may be substantially free of any structural member for securing the second material to the carrier.

Formation of the materials of the present teachings may include a variety of processing steps depending on the desired configuration of the materials. Various processes such as molding (e.g., compression, injection or other molding), extrusion or the like may be used to form the carrier material and the second material. The carrier and second material may be formed from a multi-shot injection molding process.

The size and shape of the baffle assembly may depend upon the desired location of the device within a cavity. The rim portion of the baffle assembly may be shaped so that it fits within and conforms to a cross-section of a cavity. The baffle assembly may be shaped so that in the event that the second material is an expandable material, the expandable material expands directly into areas that are traditionally difficult to access (e.g., small areas within a cavity that are difficult to seal due to the size and shape of the area). The second material may be located onto the interior portion so that the second material can be activated to expand over and onto the interior portion. The baffle assembly may be located within a cavity with one or more fasteners so that the rim portion of the baffle assembly does not contact the cavity wall prior to expansion of the second material.

The baffle assembly may include one or more openings along the interior portion of the carrier. The second material may expand to cover the one or more openings. Alternatively, the baffle assembly may include edges, slots, or attachments that guide the expansion of the second material and thus prevent the second material from covering the one or more openings. The one or more openings may be present so that fluid (e.g., e-coat fluid) can drain from one side of the baffle assembly to the other prior to expansion of the second material. The one or more openings may allow for devices or materials within a cavity to pass from one side of the baffle assembly to another side of the baffle assembly before or after expansion of the second material. As an example, the one or more openings may allow for drain tube passage. The one or more openings may also provide access points within a cavity for welding purposes.

The carrier may comprise a rigid polymeric material. The carrier may comprise a flat metal sheet. The carrier may also include a mesh material. The carrier may include a variety of other materials such as polymers, elastomers, fibrous materials (e.g., cloth or woven materials), thermoplastics, plastics, nylon, and combinations thereof. The carrier may be flexible to allow for bending of the baffle assembly to fit within desired small spaces of a cavity.

After placement of the baffle assembly into a cavity, the second material may be an activatable material that expands according to a predetermined set of conditions. For example, exposure to certain levels of heat may cause the second material to expand. The volumetric expansion of the second material may vary depending upon the sealing and/or baffling needs of a particular cavity. The second material may expand at least about 100%. The second material may expand less than about 2000%. The second material may expand at least about 500%, at least about 1000%, or more. The second material may expand less than about 1000% or even less than about 500%.

The second material may be a resinous generally dry to the touch or tacky and may be shaped in any form of desired pattern, placement, or thickness, but is preferably of substantially uniform thickness. Though other heat-activated materials are possible for the second material, a preferred heat activated material is an expandable polymer or plastic, and preferably one that is foamable. The second material may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the foam may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104.

The expandable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The baffle assembly of the present teachings may be installed into an automotive vehicle although it may be employed for other articles of manufacture such as boats, buildings, furniture, storage containers or the like. The baffle assembly may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

Figure 2:
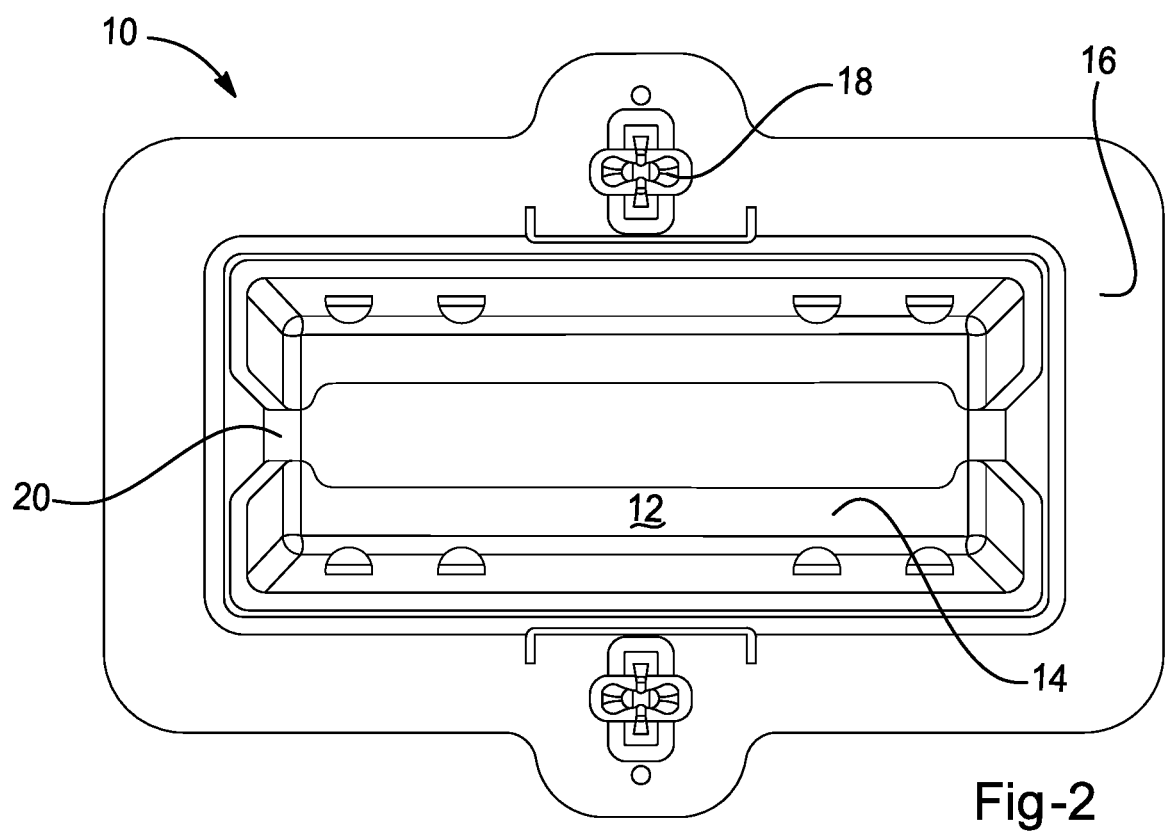
FIG. 2 shows a top down view of the baffle assembly shown at FIG. 1.
Figure 3:
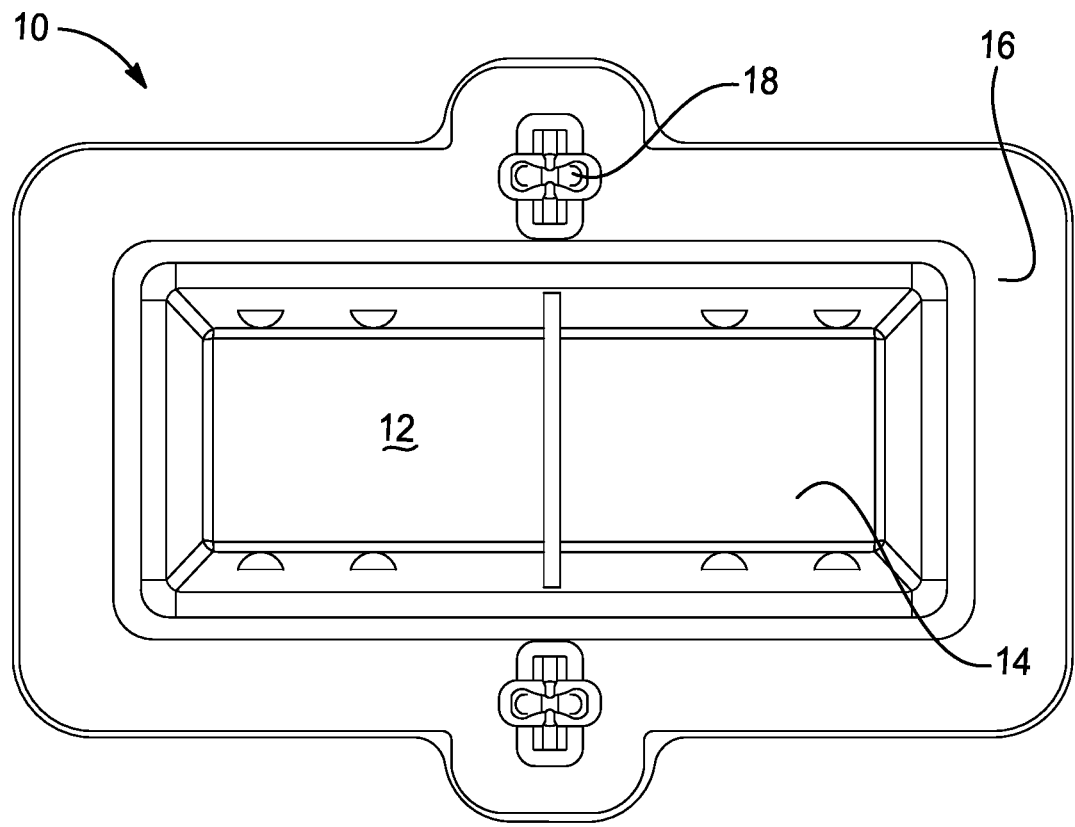
FIG. 3 shows a bottom view of the baffle assembly shown at FIG. 1.
Figure 4:
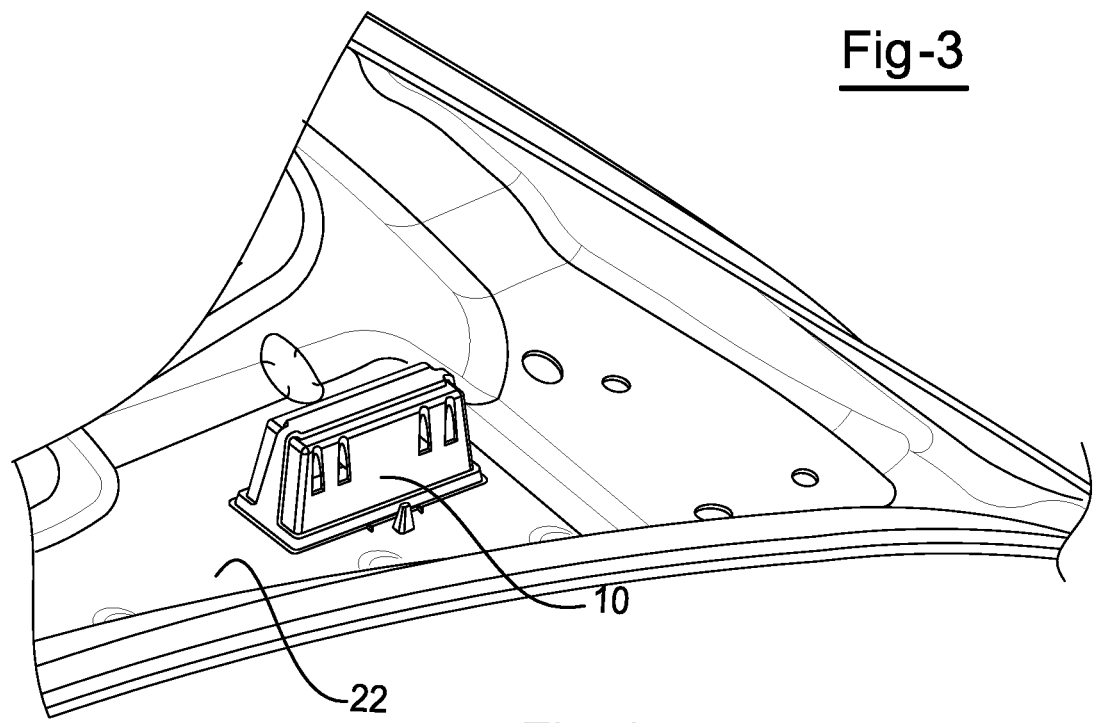
FIG. 4 shows a perspective view of the baffle assembly of FIG. 1 in use.

FIGS. 1-3 show the baffle assembly 10 having a carrier 12 including an interior portion 14, a rim portion 16, a fastener 18 and including a resinous material layer 20 located thereon. FIG. 4 shows the baffle assembly 10 in use in a vehicle cavity 22.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A baffle for use in a cavity of a transportation vehicle, comprising:
   i. a carrier including:
      a. an interior portion that includes a plurality of walls extending upward;
      b. a rim portion that extends to substantially surround the interior portion;
      c. a fastener that extends upward from the rim portion in the same direction as the plurality of walls so that it is adapted to engage an opening in the cavity that lies above or below the rim portion;
   ii. a resinous sealant that includes a polymer that is adapted for thermal expansion upon activation by heat that is located on at least a portion of the interior portion;
      wherein the rim portion is substantially free of any sealant prior to activation of the sealant.

2. The baffle of claim 1, wherein the plurality of walls extend upward to meet a top surface of the interior portion, wherein the top surface is substantially parallel to the rim portion.

3. The baffle of claim 1, wherein the rim portion completely circumscribes the interior portion.

4. The baffle of claim 1, wherein the sealant extends along a portion one or more of the plurality of walls.

5. The baffle of claim 2, wherein the sealant extends over a portion of the top surface of the interior portion.

6. The baffle of claim 3, wherein the interior portion includes a top surface that is located at least about 1 mm, at least about 3 mm or even at least about 5 mm above the rim portion.

7. The baffle of claim 3, wherein the resinous material is such that it can be melted for injection molding at a first temperature, and thereafter be activated by heating at an activation temperature above the first temperature for causing it to expand.

8. The baffle of claim 2, wherein the fastener extends substantially perpendicular to the rim portion.

9. The baffle of claim 1, wherein the fastener is adapted to extend into an opening located on a transportation vehicle member.

10. The baffle of claim 5, wherein one or more of the plurality of walls are arranged at an angle that is substantially perpendicular to the rim portion.

11. The baffle of claim 1, wherein the top surface of the interior portion is a continuous surface that is substantially free of any openings.

12. The baffle of claim 11, wherein one or more of the plurality of side walls includes one or more openings.

13. The baffle of claim 2, including at least four sidewalls.

14. The baffle of claim 11, wherein the resinous sealant extends as a single continuous piece over the interior portion.

15. The baffle of claim 1, wherein at least a portion of the interior portion remains free of any resinous sealant material prior to activation of the resinous sealant material.

16. The baffle of claim 1, wherein the baffle is adapted to extend into a vehicle cavity.

17. The baffle of claim 2, including at least two fasteners.

18. The baffle of claim 1, wherein the resinous sealant circumscribes the interior portion.

19. A method for forming the baffle of claim 1, comprising:
   injecting a polymeric carrier material into a first cavity of a mold to form the carrier;
   injecting the resinous sealant material into a second cavity of the mold so that the sealant is located onto the interior portion of the baffle but not onto the rim portion of the baffle.

20. The baffle of claim 11, wherein the interior portion includes a top surface that is located at least about 1 mm, at least about 3 mm or even at least about 5 mm above the rim portion.

* * * * *